(12) United States Patent
Arata et al.

(10) Patent No.: US 7,204,454 B2
(45) Date of Patent: Apr. 17, 2007

(54) AIRCRAFT WITH ARTICULATED LEADING EDGE OF FUSELAGE AND WINGS

(75) Inventors: Allen A. Arata, Los Angeles, CA (US); David H. Graham, San Pedro, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 95 days.

(21) Appl. No.: 11/066,886

(22) Filed: Feb. 25, 2005

(65) Prior Publication Data

US 2006/0192058 A1 Aug. 31, 2006

(51) Int. Cl.
*B64C 27/00* (2006.01)

(52) U.S. Cl. ..................................................... 244/39

(58) Field of Classification Search ...... 244/12.1–12.2, 244/23 A–23 C, 17.21, 36–38, 34 A, 119, 244/214, 218, 45 R, 46, 198, 99.12, 35 A
See application file for complete search history.

(56) References Cited

U.S. PATENT DOCUMENTS

| 1,215,295 | A | * | 2/1917 | MacKay | 244/218 |
|---|---|---|---|---|---|
| 1,353,666 | A | * | 9/1920 | Page | 244/210 |
| 1,414,200 | A | | 4/1922 | Page | |
| 1,427,012 | A | | 8/1922 | Page | |
| 1,606,117 | A | * | 11/1926 | Caples | 244/218 |
| 1,730,249 | A | * | 10/1929 | Smith | 244/218 |
| 1,818,000 | A | | 8/1931 | Moles | |
| 1,867,013 | A | | 7/1932 | Kratzer | |
| 1,891,261 | A | | 12/1932 | Gunn | |
| 1,945,254 | A | | 1/1934 | Bittner | |
| 2,500,512 | A | | 3/1950 | Bowers | |
| 2,793,826 | A | | 5/1957 | Fielder | |

(Continued)

FOREIGN PATENT DOCUMENTS

DE 91 13 090.5 2/1992

(Continued)

OTHER PUBLICATIONS http://www.b737.org.uk/flightcontrols.htm (available on the web Oct. 20, 2001).*

(Continued)

*Primary Examiner*—Teri Pham Luu
*Assistant Examiner*—Edward J. Mayle
(74) *Attorney, Agent, or Firm*—Alan G. Towner, Esq.; Pietragallo, Bosick & Gordon LLP

(57) ABSTRACT

An articulated leading edge for the fuselage and wings of an aircraft is disclosed. The leading edge may be moved from an undeflected or retracted position adjacent to the fuselage and wings to a deflected or extended position. The leading edge includes fuselage and wing portions which are articulated with respect to each other. The fuselage portion of the leading edge may be rotated around an axis near the nose of the aircraft. When the fuselage portion is rotated, the region between the fuselage portion and wing portion of the leading edge bends and the wing portion is elevated with respect to the wing. In such an extended position, the leading edge increases lift of the aircraft at low speeds. In the retracted position, gaps associated with the leading edge are avoided.

17 Claims, 3 Drawing Sheets

U.S. PATENT DOCUMENTS

| | | | |
|---|---|---|---|
| 3,153,523 A | 10/1964 | Lowman, III | |
| 3,170,657 A | 2/1965 | Riebe et al. | |
| 3,447,761 A | 6/1969 | Whitener et al. | |
| 3,486,720 A | 12/1969 | Seglem et al. | |
| 3,572,617 A * | 3/1971 | Ricard | 244/46 |
| 3,630,471 A * | 12/1971 | Fredericks | 244/36 |
| 3,638,886 A | 2/1972 | Zimmer | |
| 3,847,369 A | 11/1974 | Phillips et al. | |
| 4,008,867 A | 2/1977 | Kaniut | |
| 4,161,300 A | 7/1979 | Schwaerzler et al. | |
| 4,267,990 A | 5/1981 | Staudacher | |
| 4,384,693 A | 5/1983 | Pauly et al. | |
| 4,494,713 A * | 1/1985 | Kim | 244/15 |
| 4,585,192 A | 4/1986 | Clifford-Jones | |
| 4,667,898 A * | 5/1987 | Greenhalgh | 244/46 |
| 4,729,528 A | 3/1988 | Borzachillo | |
| D314,366 S * | 2/1991 | Waaland et al. | D12/333 |
| 5,056,741 A | 10/1991 | Bliesner et al. | |
| 5,062,595 A | 11/1991 | Maxworthy | |
| 5,156,358 A * | 10/1992 | Gerhardt | 244/36 |
| 5,312,070 A | 5/1994 | Arena | |
| 5,538,201 A * | 7/1996 | Gerhardt | 244/204 |
| 5,897,076 A | 4/1999 | Tracy | |
| 5,921,506 A | 7/1999 | Appa | |
| 6,068,219 A * | 5/2000 | Arata | 244/219 |
| 6,073,889 A | 6/2000 | Dees et al. | |
| 6,129,308 A | 10/2000 | Nastasi et al. | |
| 6,179,248 B1 * | 1/2001 | Putman et al. | 244/36 |
| 6,213,433 B1 | 4/2001 | Gruensfelder et al. | |
| 6,220,551 B1 | 4/2001 | Saiz | |
| 6,227,498 B1 * | 5/2001 | Arata | 244/219 |
| 6,286,790 B1 | 9/2001 | Thorpe | |
| 6,328,265 B1 | 12/2001 | Dizdarevic | |
| 6,343,768 B1 * | 2/2002 | Muldoon | 244/7 R |
| 6,375,126 B1 | 4/2002 | Sakurai et al. | |
| 6,475,933 B1 | 11/2002 | Brown et al. | |
| 6,634,594 B1 * | 10/2003 | Bowcutt | 244/35 A |
| 6,659,394 B1 * | 12/2003 | Shenk | 244/7 C |
| 6,732,974 B1 * | 5/2004 | Lewis et al. | 244/35 A |
| 2002/0195527 A1 | 12/2002 | Broadbent | |
| 2004/0079839 A1 * | 4/2004 | Bath et al. | 244/131 |

FOREIGN PATENT DOCUMENTS

| | | |
|---|---|---|
| EP | 0538963 B1 | 3/1997 |
| EP | 0781704 B1 | 5/2002 |
| GB | 2003807 A | 3/1979 |
| GB | 2100684 A | 1/1983 |
| WO | WO 97/49607 | 12/1997 |

OTHER PUBLICATIONS http://www.aircraftresourcecenter.com/AWA1/001-100/walk070_F14/part2/images/doc2-021.jpg (available on the web ca. 2000).*

* cited by examiner

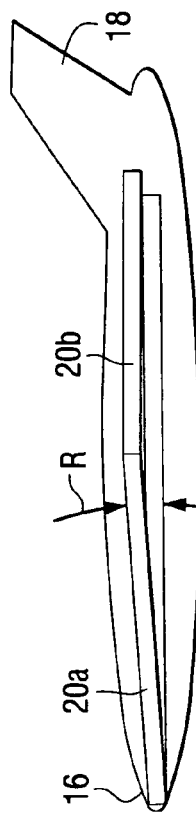
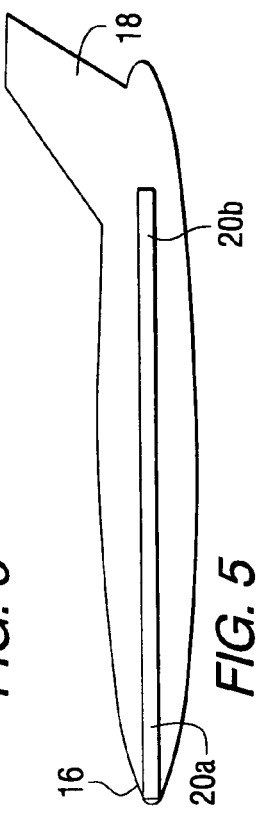
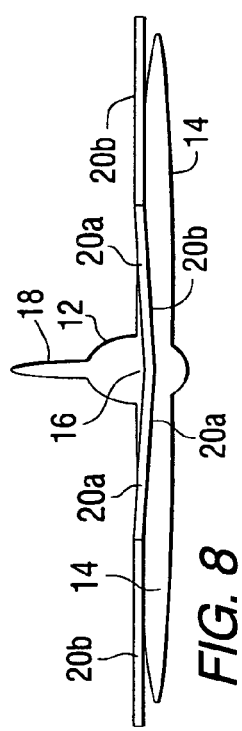
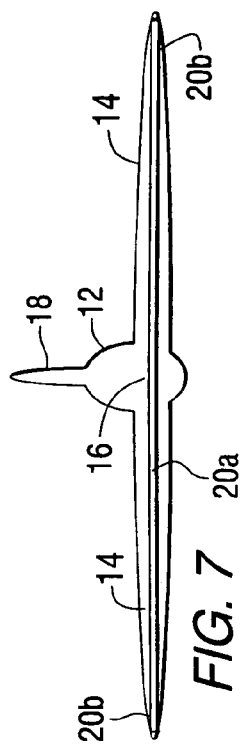
FIG. 6  FIG. 5  FIG. 8  FIG. 7
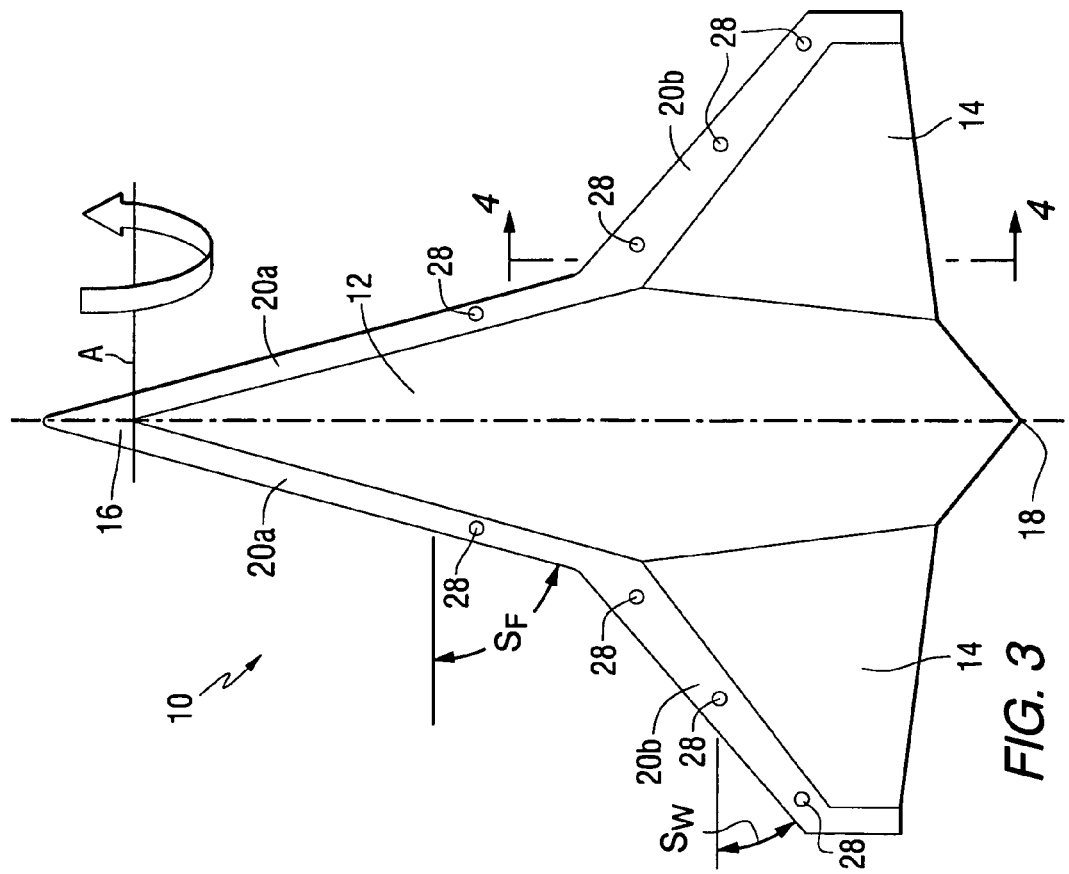
FIG. 3

AIRCRAFT WITH ARTICULATED LEADING EDGE OF FUSELAGE AND WINGS

FIELD OF THE INVENTION

The present invention relates to aircraft with a movable leading edge, and more particularly relates to an articulated fuselage and wing leading edge which can be moved from an undeflected or retracted position against the fuselage and wings to a deflected or extended position which provides increased lift for the aircraft at low speeds.

BACKGROUND INFORMATION

Aircraft often utilize devices on leading wing edges in order to increase lift at low speeds. For example, aircraft with high leading edge wing sweep may use devices on the leading edges of the wings to increase lift during takeoff and landing and thus reduce runway length. Such leading edge devices typically have gaps that are visible from the front when the devices are stowed. However, some aircraft have survivability requirements that do not allow leading edge gaps when the devices are stowed. It would be desirable to provide a leading edge device which avoids such problems.

SUMMARY OF THE INVENTION

The present invention provides an articulated leading edge for the fuselage and wings of an aircraft. The leading edge may be moved from an undeflected or retracted position adjacent to the fuselage and wings to a deflected or extended position away from the fuselage and wings which increases lift of the aircraft, particularly during takeoff, landing and other low speed operations. When the leading edge is retracted to its undeflected position during flight, unwanted gaps are avoided.

An aspect of the present invention is to provide an aircraft comprising a fuselage, wings connected to the fuselage, and an articulated leading edge movable from a retracted position against the fuselage and wings to an extended position from the fuselage and wings.

This and other aspects of the present invention will be more apparent from the following description.

BRIEF DESCRIPTION OF THE DRAWINGS

FIG. 3 is a partially schematic top view of the aircraft of FIG. 1, with the articulated leading edge in a deflected or extended position.

FIG. 5 is a partially schematic side view of an aircraft including an articulated leading edge of the fuselage and wings in a retracted position in accordance with an embodiment of the present invention.

FIG. 6 is a partially schematic side view of the aircraft of FIG. 5, with the articulated leading edge in an extended position.

FIG. 7 is a partially schematic front view of an aircraft including an articulated leading edge of the fuselage and wings in a retracted position in accordance with an embodiment of the present invention.

FIG. 8 is a partially schematic front view of the aircraft of FIG. 7, with the articulated leading edge in an extended position.

In FIG. 12, the Krueger flap is stowed and the leading edge is retracted. In FIG. 13, the Krueger flap remains stowed, but the leading edge is in an extended position. In FIG. 14, the Krueger flap is deployed and the leading edge is in the extended position.

DETAILED DESCRIPTION

Figure 1:
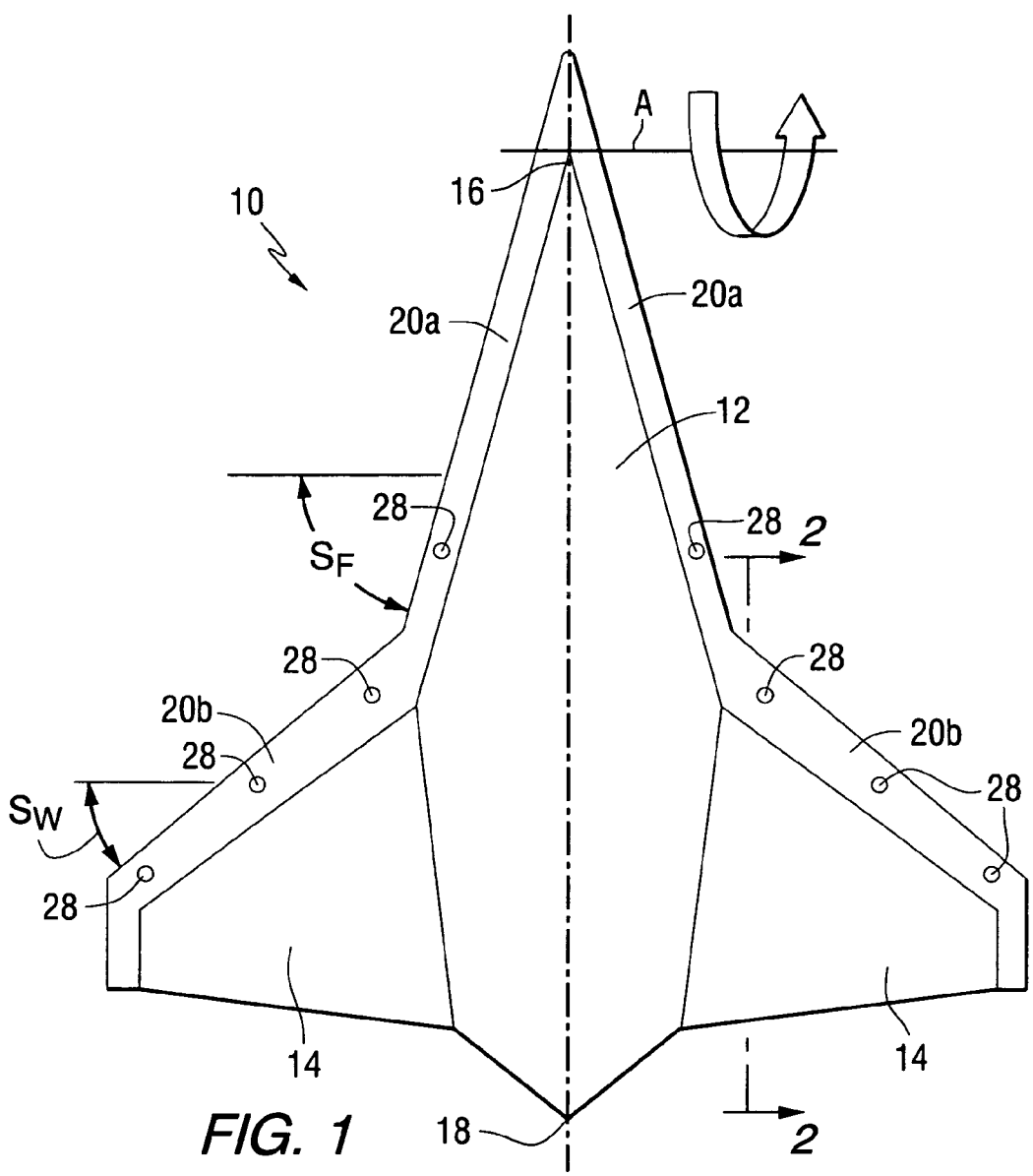
FIG. 1 is a partially schematic top view of an aircraft including an articulated leading edge adjacent to the fuselage and wings of the aircraft in accordance with an embodiment of the present invention.

FIG. 1 is a partially schematic top view of an aircraft 10 including a fuselage 12 and wings 14. The aircraft 10 has a nose section 16 and a tail section 18. As used herein, the term "fuselage" includes the body of an aircraft as well as any structural features integrally formed with the body, such as strakes, leading edge extensions and the like which have leading edges.

As shown in FIG. 1, an articulated leading edge in accordance with an embodiment of the present invention includes portions 20*a* adjacent to the fuselage 12, and portions 20*b* adjacent to the wings 14. The leading edge portions 20*a* and 20*b* are articulated with respect to each other. As used herein, the term "articulated" means that the leading edge portions 20*a* and 20*b* can bend and/or torsionally flex in relation to each other. The fuselage portions 20*a* of the leading edge are rotatable around an axis A that is substantially parallel with a transverse direction of the aircraft. In this embodiment, the axis of rotation A of the fuselage leading edge portions 20*a* is located adjacent to the nose 16 of the fuselage 12. However, the axis of rotation A may be located at any other suitable location along the longitudinal direction of the aircraft. For example, the axis of rotation A may be moved farther aft.

Figure 2:
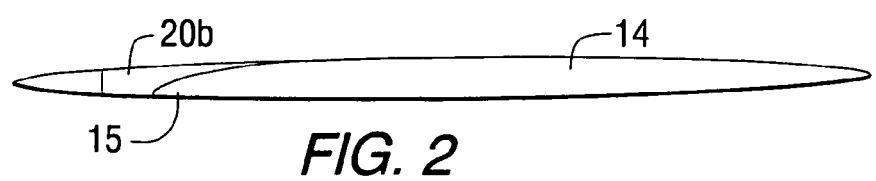
FIG. 2 is a partially schematic cross sectional view taken through section 2—2 of FIG. 1, illustrating a wing of the aircraft and a portion of the leading edge in an undeflected or retracted position in accordance with an embodiment of the present invention.

FIG. 2 is a cross sectional view of the wing 14 and a wing leading edge 20*b*, taken through section 2—2 of FIG. 1. In FIG. 2, the leading edge portion 20*b* is in a retracted position in which the leading edge 20*b* is seated against and contacts the wing 14.

Figure 4:
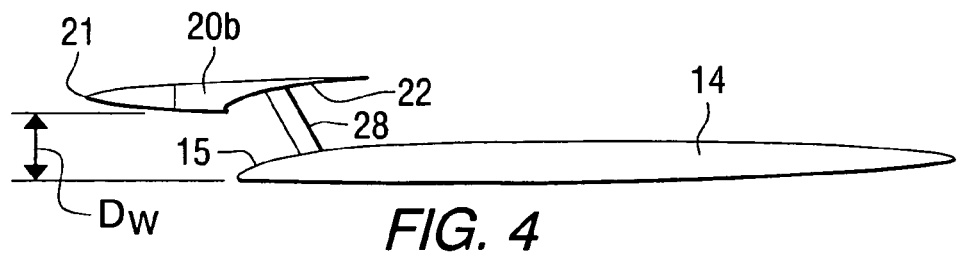
FIG. 4 is a partially schematic cross sectional view taken through section 4—4 of FIG. 3, illustrating the extended position of the leading edge with respect to the wing.

FIGS. 3 and 4 are similar views as shown in FIGS. 1 and 2, respectively, except the fuselage leading edge portions 20*a* have been rotated around the axis A through an arc R to an extended position, and the wing leading edge portions 20*b* have been articulated with respect to the fuselage leading edge portions and elevated with respect to the wings 14. The extended position of a wing leading edge portion 20*b* is most clearly shown in FIG. 4, which is a cross sectional view of the wing 14 taken through line 4—4 of FIG. 3. As shown in FIG. 4, the wing leading edge portion 20b is in an extended position away from the wing 14. In the extended position, the wing leading edge portion 20b is elevated above the wing 14 a distance $D_W$.

Although not shown in FIG. 3 or 4, at least a portion of each fuselage leading edge portion 20a is elevated away from the fuselage 12 when the fuselage leading edge portions 20a are rotated around the axis A. If the axis of rotation A is moved farther aft from the location shown in FIGS. 1 and 3, the portion of each fuselage leading edge 20a behind the axis A may deflect upward while the portion of each fuselage leading edge in front of the axis A may deflect downward.

As can be seen most clearly in FIGS. 1 and 3, the wings 14 of the aircraft 10 have a sweep angle $S_W$ measured from a transverse direction of the aircraft. As can also be seen in FIGS. 1 and 3, the fuselage 12, including strakes and other structures having leading edges, may also have a sweep angle $S_F$ measured from the transverse direction of the aircraft 10. In the embodiment illustrated in FIGS. 1 and 3, the wing sweep angle $S_W$ is different from the fuselage sweep angle $S_F$, i.e., the wing sweep angle $S_W$ is less than the fuselage sweep angle $S_F$.

In the embodiments shown in FIGS. 1 and 3, the wing sweep angle $S_W$ remains constant along the wing 14, and the fuselage sweep angle $S_F$ remains constant along the fuselage 12. However, the wing sweep angle $S_W$ and/or the fuselage sweep angle $S_F$ may vary. Accordingly, although constant wing and fuselage sweep angles $S_W$ and $S_F$ are shown in the present figures, any other desired wing and fuselage configuration may be used in accordance with the present invention.

FIGS. 5 and 6 are partially schematic side views of an aircraft similar to that shown in FIGS. 1 and 3. In FIG. 5, the fuselage and wing portions 20a and 20b of the leading edge are in the retracted position. In FIG. 6, the leading edge portions 20a and 20b are in the extended position, illustrating rotation of the fuselage leading edge portion 20a around an axis near the nose 16 of the aircraft, and articulation of the wing leading edge portion 20b to an elevated position with respect to the wings 14. The fuselage leading edge portion 20a may traverse an arc R of from zero to about 10 degrees when rotated around the axis A from the retracted position shown in FIG. 5 to the extended position shown in FIG. 6. As shown in FIG. 6, the fuselage portion 20a and wing portion 20b are articulated with respect to each other, i.e., the region adjoining the fuselage and wing portions is bent.

FIGS. 7 and 8 are partially schematic front views of an aircraft similar to that shown in FIGS. 1 and 3. In FIG. 7, the fuselage and wing portions 20a and 20b of the leading edge are in the retracted position. In FIG. 8, the leading edge portions 20a and 20b are in the extended position, wherein the fuselage leading edge portion 20a is rotated around the axis A, and the wing leading edge portion 20b is articulated by bending with respect to the wing leading edge portion 20b and elevated with respect to the wings 14.

In accordance with an embodiment of the present invention, the fuselage and wing portions 20a and 20b of the leading edge may be articulated with respect to each other by torsional flexing. For example, each wing portion 20b may be torsionally flexed with respect to the adjoining fuselage portion 20a in such a manner to vary the incidence angle of the wing portion 20b of the leading edge. The incidence may thus be adjusted, e.g., to align with local air flow to improve control effectiveness.

The leading edge portions 20a and 20b may be made of any suitable material. For example, the main body of each leading edge may comprise a substantially rigid material such as aluminum or conventional composite materials. The articulated region between the portions 20a and 20b may be made of any suitable bendable or flexible material such as metals or composites. Alternatively, the articulated region may comprise any suitable type of mechanically hinged joint. The leading edge 20a and 20b preferably has no gaps detectable in the electromagnetic spectrum.

The mechanism used to extend and retract the leading edge portions 20a and 20b may be any suitable linkage 28, such as a conventional double pivoted screwjack and four bar linkages. Any suitable controller for actuating the mechanism may be used, such as conventional manually operated controls or automatic controls for extending and retracting the leading edge portions based on airspeed.

Figure 9:
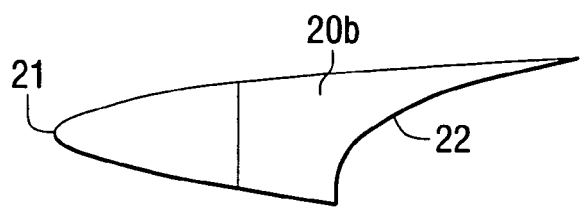
FIG. 9 is a partially schematic cross sectional view of an articulated leading edge having a concave rear contact surface in accordance with an embodiment of the present invention.

FIG. 9 is a partially schematic cross sectional view of a wing leading edge portion 20b, which includes a front edge 21 and a rear contact surface 22. In the embodiment shown in FIG. 9, the rear contact surface 22 has a concave shape which conforms with the front edge 15 of the wing 14. Thus, the rear contact surface 22 and the front edge 15 are tightly seated against each other when the leading edge 20b is in the retracted position. This conforming arrangement of the rear contact surface 22 of the wing leading edge portion 20b and front edge 15 of the wing 14 can be seen in FIGS. 2 and 4.

As shown in FIGS. 2, 4 and 9, the front edge 21 of the wing leading edge portion 20b may have a relatively pointed shape, while the rear contact surface 22 and front edge 15 of the wing 14 may have a relatively rounded shape. Thus, the front edge 21 of the wing leading edge portion 20b has a smaller radius of curvature than the front edge 15 of the wing 14. This may be desirable in some aircraft because the rounder front edge 15 of the wing 14 may delay wing stall.

Figure 10:
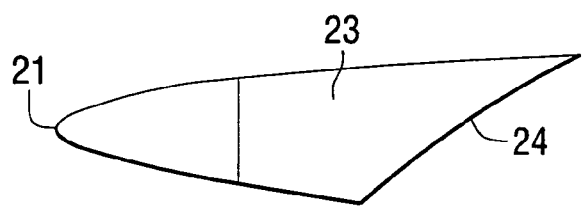
FIG. 10 is a partially schematic cross sectional view of an articulated leading edge having a angled rear contact surface in accordance with an embodiment of the present invention.
Figure 11:
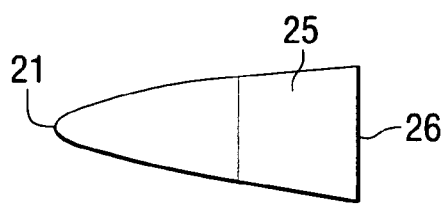
FIG. 11 is a partially schematic cross sectional view of an articulated leading edge having a flat rear contact surface in accordance with an embodiment of the present invention.

FIGS. 10 and 11 illustrate alternative rear contact surface shapes of leading edges in accordance with embodiments of the present invention. In FIG. 10, the leading edge 23 has an angled contact surface 24. In FIG. 11, the leading edge 25 has a generally flat contact surface 26.

Figure 14:
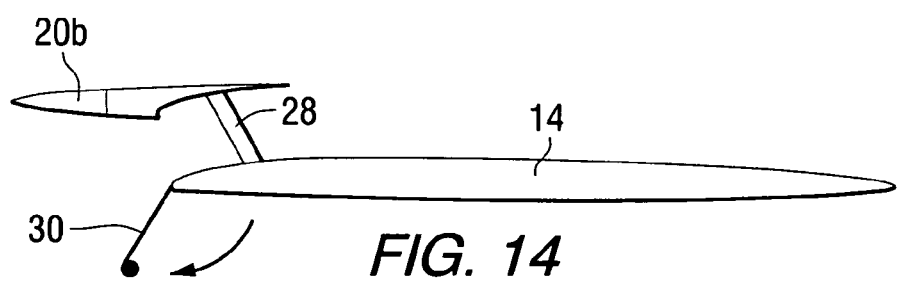
FIGS. 12–14 are partially schematic cross sectional views of an aircraft wing including a Krueger flap and an articulated leading edge in accordance with an embodiment of the present invention.
Figure 13:
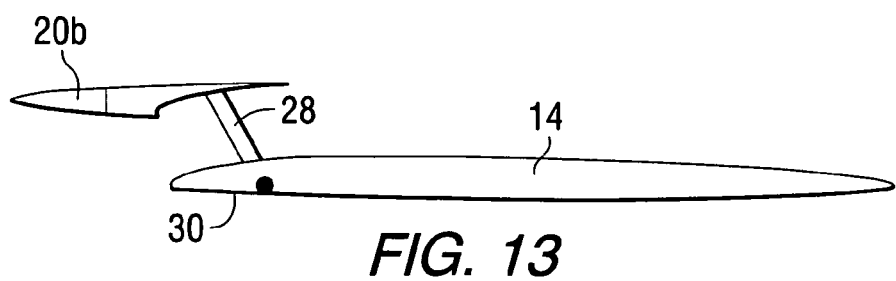
Figure 12:
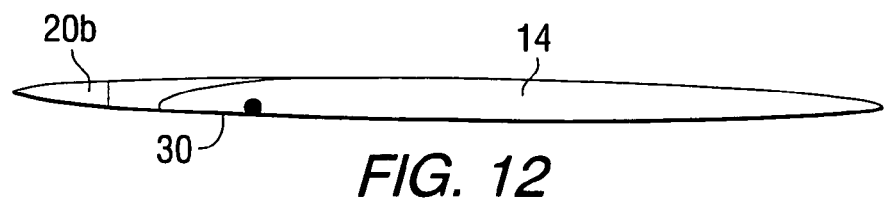

FIGS. 12–14 illustrate an embodiment of the present invention in which a conventional Krueger flap 30 is rotatably mounted on the wing 14. In FIG. 12, the wing leading edge portion 20b is in the retracted position, and the Krueger flap 30 is in the stowed position. In FIG. 13, the wing leading edge portion 20b is extended from the wing, while the Krueger flap 30 remains stowed. In FIG. 14, the wing leading edge portion 20b is extended and the Krueger flap 30 is rotated into a deployed position. Any known Krueger flap design and deployment mechanism may be used in accordance with this embodiment of the invention.

Whereas particular embodiments of this invention have been described above for purposes of illustration, it will be evident to those skilled in the art that numerous variations of the details of the present invention may be made without departing from the invention as defined in the appended claims.

What is claimed is:

1. An aircraft comprising:
   a fuselage;
   wings connected to the fuselage; and
   an articulated leading edge movable from a retracted position against the fuselage and wings to an extended position from the fuselage and wings forming an air gap between the leading edge and the fuselage and wings, wherein the leading edge comprises fuselage and wing portions which are articulated with respect to each other.

2. The aircraft of claim 1, wherein the fuselage and wing portions of the leading edge comprise a flexible material in a region adjoining the fuselage and wing portions.

3. The aircraft of claim 1, wherein the fuselage and wing portions are articulated by bending with respect to each other.

4. The aircraft of claim 1, wherein the fuselage and wing portions are articulated by torsional flexing with respect to each other.

5. The aircraft of claim 1, wherein the fuselage leading edge portion is rotatable around an axis substantially parallel with a transverse direction of the aircraft.

6. The aircraft of claim 5, wherein the axis of rotation of the fuselage leading edge portion is located adjacent to a nose of the fuselage.

7. The aircraft of claim 5, wherein the fuselage leading edge portion is rotatable around the axis from the retracted position to the extended position in an arc of from zero to about 10 degrees.

8. The aircraft of claim 1, wherein the location of the wing leading edge portion in the extended position is elevated above the location of the wing leading edge portion in the retracted position.

9. The aircraft of claim 1, wherein the wing leading edge portion has a wing sweep angle measured from a transverse direction of the aircraft, the fuselage leading edge portion has a fuselage sweep angle measured from the transverse direction of the aircraft, and the wing and fuselage sweep angles are different.

10. The aircraft of claim 9, wherein the wing sweep angle is less than the fuselage sweep angle.

11. The aircraft of claim 1, wherein the leading edge comprises a rear contact surface which contacts the fuselage and wings when the leading edge is in the retracted position.

12. The aircraft of claim 11, wherein the rear contact surface has a shape which substantially conforms with a shape of the fuselage and a shape of the wings in areas of contact between the leading edge and the fuselage and wings.

13. The aircraft of claim 11, wherein at least a portion of the rear contact surface is concave.

14. The aircraft of claim 13, wherein the rear contact surface of the leading edge contacts a curved front edge of at least one of the wings, and the front edge of the wing has a larger radius of curvature than a front edge of the leading edge.

15. The aircraft of claim 11, wherein at least a portion of the rear contact surface is flat.

16. The aircraft of claim 1, further comprising Krueger flaps rotatably mounted on the wings.

17. The aircraft of claim 16, wherein the Krueger flaps are rotatable to deployed positions when the leading edge is in the extended position, and the Krueger flaps are rotatable to stowed positions when the leading edge is in the retracted position.

* * * * *